United States Patent [19]
Standke

[11] 3,771,761
[45] Nov. 13, 1973

[54] VALVE ACTUATOR

[75] Inventor: Gerhard Standke, Feldrennach, Germany

[73] Assignee: Runtal Holding Company S. A. Glarus, Neuchatel, Switzerland

[22] Filed: Feb. 24, 1972

[21] Appl. No.: 228,967

[30] Foreign Application Priority Data
Feb. 27, 1971  Germany.................. P 21 09 449.5

[52] U.S. Cl. .............................. 251/134, 251/133
[51] Int. Cl. ........................................... F16k 31/04
[58] Field of Search............................ 251/134, 133

[56] References Cited
UNITED STATES PATENTS

| | | |
|---|---|---|
| 2,402,732 | 6/1946 | Cohen............................ 251/134 X |
| 3,327,264 | 6/1967 | Rodaway ....................... 251/129 X |
| 3,085,781 | 4/1963 | La Pointe ...................... 251/134 X |
| 843,814 | 2/1907 | Hewlett........................... 251/133 X |
| 1,678,202 | 7/1928 | Shivers............................... 251/134 |
| 2,052,987 | 9/1936 | Persons........................... 251/134 X |

Primary Examiner—Arnold Rosenthal
Attorney—Craig & Antonelli

[57] ABSTRACT

A valve actuator having a casing adapted to be connected to a valve of the type in which a closure member is movable to and away from a valve seat and including an electromagnet. The armature of the electromagnet is secured to a longitudinally displaceable valve spindle which carries the closure member. The electromagnet is mounted for displacement in the longitudinal direction of the valve spindle and is connected to a power operated displacing means via a drive member therefor.

9 Claims, 1 Drawing Figure

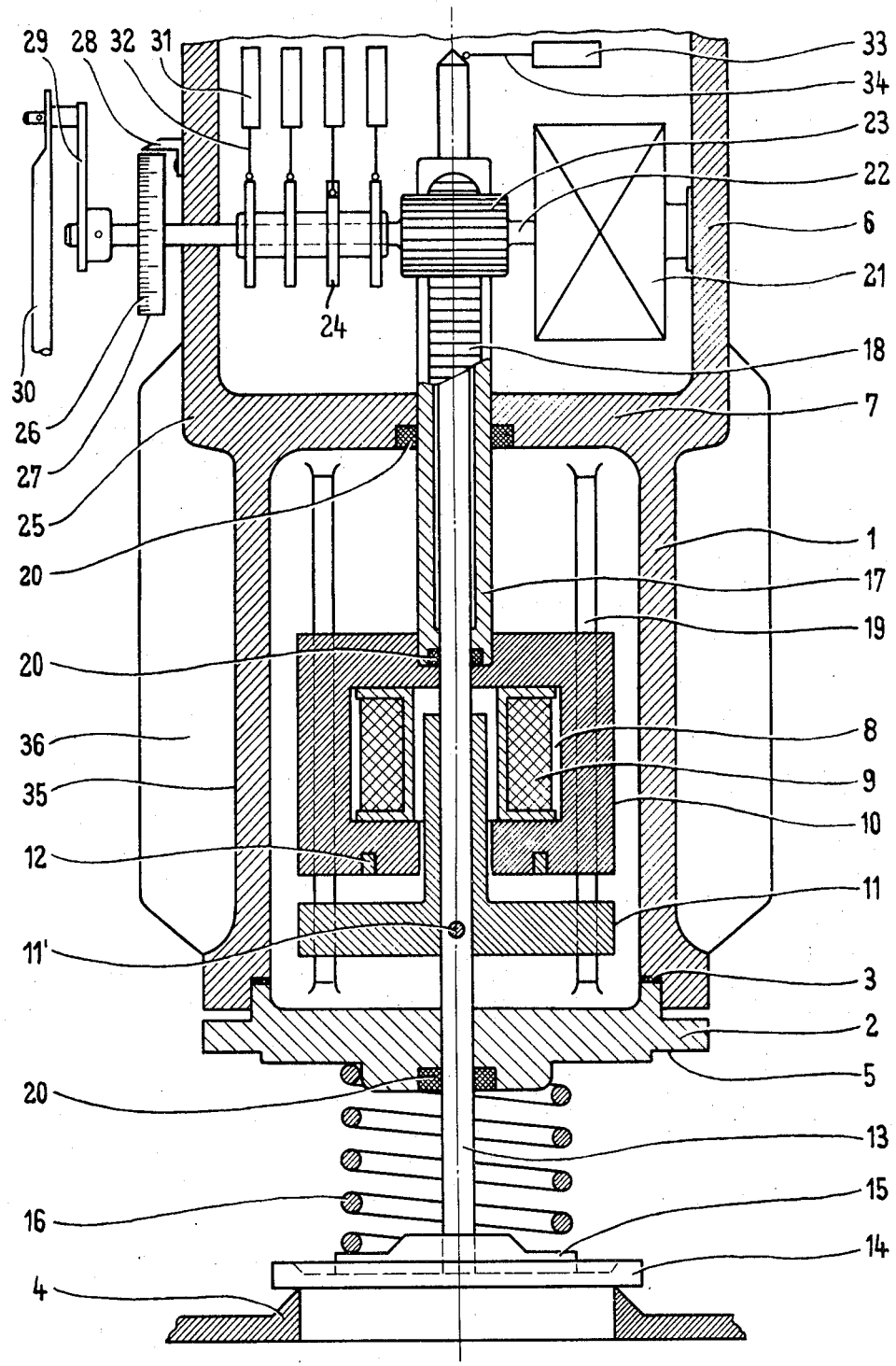

VALVE ACTUATOR

The present invention relates to an actuator for a valve of the kind comprising a closure member movable towards and away from a valve seat, the actuator having a casing which is designed for connection to the valve and in which is contained an electro-magnet, the armature of which is secured to a longitudinal displacement valve spindle which carried the closure member and which is biased to the closed position by a spring.

The actuator of this invention may be used in particular for controlling and regulating the supply of gas to the gas burners of heating installations.

Heavy demands are made upon the control and regulating devices for gas burners as used for operating large heating installations of, for example, blocks of flats. Such devices generally consist of valves which are actuated by electric motors, electro-magnets or by hydraulic or pneumatic means and which are fitted in the supply pipes running to the gas burners and, under the control of thermostats and timing switches, open, or close the bore of the pipe, or operate to vary the flow therethrough. In such systems, a rapid opening to provide a limited bore cross-section is necessary for starting up the gas burner, and equally necessary is a rapid closing action in the event of the gas not igniting at the burner or when faults occur during operations; on the other hand however, the flow-restricting operation should proceed slowly and continuously for the purpose of regulating the capacity of the ignited burner. The gas pressure and the force of the closing spring have to be overcome during the opening of the valve, and very considerable actuating forces are required because of the great size of the valve closure member, corresponding to the considerable cross-sectional area of the pipe, and because of the unavoidably high pressures required for achieving a perfect seal. Special requirements are also called for as regards the service life of the valves and of their actuators, and heavy wear occurs on the closure member and the valve seat as well as on the end-faces of the electro-magnet and armature that move into contact with each other, such wear being particularly great as a result of the rapidly executed closing or opening movements; this wear can however be kept to a low level if the masses that participate in these movements can be kept small.

To meet these requirements, control and regulating means for gas burners are known which are equipped with two valves, one upstream of the other, and with the associated actuators; in such systems one of the valves is used exclusively for opening and closing the bore of the supply pipe, i.e., for controlling the burner, whereas the second valve is used merely for restricting flow of gas, i.e., for regulating capacity. In most cases these two valves are actuated by electromagnetic means; although, the second valve may be actuated by an electric motor. However, control and regulating devices of this type, usually combined to form a block-like unit, are very expensive and complicated.

To achieve simplification it has therefore been proposed to replace the two valves by only one such valve which is actuated by an electric motor; however, this in turn carries the disadvantage that, when actuation is by means of an electric motor, valve characteristic curves having steep flanks, particularly desired during opening and closing, cannot be obtained on account of the sluggish movement of the closure member, which movement must however be necessarily slow for the regulating operation.

Swiss Pat. No. 497.032 discloses an actuator which operates on the electro-magnetic principle and whereby, in addition to the control operation, it is also possible to carry out a regulating operation in the range in which the valve is fully open. For this purpose, opening and closing are effected by means of an electro-magnet, operating on alternating current and contained in an oil-filled casing, the armature of which magnet engages a longitudinally displaceable valve spindle which is biased by a closing spring. For effecting the regulating operation, an additional hydraulic actuator in the form of a diaphragm, subjected to the pressure of a fluid, is provided, the movement of the diaphragm being transmitted by way of a pin to the valve spindle when the latter is near its terminal position. The lift which is obtainable by means of this arrangement and which may beused for regulating purposes, is however very limited and the necessary electro-magnet, since it is required to effect opening up to the maximum lift, has to be of corresponding size. The resultant considerable mass of the armature requires complicated means for damping its movement, and it also considerably reduces the service-life of the valve on account of the wear which occurs on the valve seat, the closure member and the opposed end faces of the electro-magnet and armature.

The actuator of the present invention however is capable of effecting a slow movement of the valve spindle in both directions and over the entire stroke for the purpose of restricting flow, and thus of effecting regulation, whilst at the same time providing a rapid opening and closing movement involving the minimum amount of wear on the moving parts.

According to the present invention the improved actuator comprises a casing adapted to be connected to a valve of the kind having a closure member movable towards and away from a seat, and including an electro-magnet a cooperating armature connected to a longitudinally displaceable valve spindle controlling the position of the closure member, means mounting the electro-magnet for movement in the longitudinal direction of the valve stem, power operated displacing means and a drive element connecting the displacing means with the electro-magnet.

The actuator of this invention differs from those of the prior art in that the electro-magnet is moved as required by the displacing means whether or not the armature has been attracted.

The opening of the valve is effected by energising the electro-magnet to attract the armature thereto; since only a small supply of gas is necessary for starting up a gas burner, a short stroke, adjustable as required by displacement of the electro-magnet, suffices for the purpose. This short stroke calls for a low-capacity electro-magnet which undergoes correspondingly reduced heating-up and has an armature of small mass; consequently wear occurring upon closing is reduced, and expensive additional damping means become unnecessary. After the opening operation and the attraction of the armature to the electro-magnet that then takes place, the displacement means takes over the task of moving the valve spindle over the entire stroke while the armature remains attracted, this movement being necessary for restricting the cross-section and thus for regulating the gas burner; the movement of the valve spindle can now be executed slowly or more rapidly, as required, and stopped at any point, independently of the operation of the electro-magnet. To close the valve rapidly, the electro-magnet is de-energised, and this can be done at any required position of the valve spindle, the closure member then being pressed against the valve seat by the action of the closing spring normally provided.

Thus, in the case of the actuator of this invention the opening and closing operations are completely separated from the regulating operation. Since the two first operations are carried out by an electro-magnet and the other by a displacing means, these operations can also be undertaken independently of each other, so that - and this is the decisive advantage of this actuator over all others - this proposal makes it possible to construct actuators, the control and regulating characteristics of which can be predetermined in almost any manner required, and adjusted. The proposal includes the possibility of connecting the armature by way of a drive element to the displacement means, instead of securing the armature to the valve spindle.

In an advantageous form of the actuator, the drive element is constituted by a tube which is pushed over the valve spindle, the electro-magnet being attached to this tube and the displacing means engaging it. The use of a tube as the thrust element leading to the displacing means results in a simple and compact design of actuator.

In the actuator of the invention, the displacing means expediently takes the form of a reversible geared motor, on the driving shaft of which is mounted a pinion which meshes with a rack provided on the tube. A geared motor occupies only little space as compared with other power-actuated displacement means such as for example pneumatic or hydraulic systems; furthermore the geared motor has the advantage that it can be accurately controlled in a simple manner.

An electric limit switch, actuated by the valve spindle, can be fitted on the casing of the actuator. The closing and opening position of the valve can be monitored by means of this limit-switch.

Rotatable cam discs, which actuate electric control switches are provided on the casing, are advantageously mounted on the driving shaft of the geared motor. These control switches, actuated by the cam discs in dependence upon the particular position of the valve spindle, serve the purpose of communicating the particular position of the valve spindle to an associated monitoring member and, by appropriately controlling the geared motor, of adjusting the valve spindle to a desired position predetermined by a rotation of the cam discs.

For the purpose of actuating a control or regulating element of a gas burner, for example an air-valve, the driving shaft may carry a rocking lever to which a control rod is connected.

An indicating device can be provided on the driving shaft for the purpose of visually indicating the position of the valve spindle at any moment.

Guides for the electo-magnet and the armature and fitted in the casing ensure that the actuator operates in a reliable manner in that they effectively prevent twisting of the magnet and armature.

For the purpose of reducing the eddy-current losses when the electro-magnet operates on alternating current, the yoke of the magnet as well as the armature may be laminated. This reduces the heat that is generated during operation of the actuator to a low level.

For the purpose of dissipating the heat generated in the electro-magnet, the casing of the actuator may be filled with an inorganic oil, and the casing fitted with oil seals and with cooling fins on its outer wall. These measures for dissipating the heat enable the actuator to be of smaller dimensions.

The construction of the proposed electro-magnetic will now be described in greater detail with reference to the accompanying drawing which is a longitudinal section through the actuator.

The illustrated actuator has a casing 1 made of a cast aluminium and filled with an inorganic oil; the casing is closed in an oil-tight manner by means of a plate 2 and with the aid of seals 3. The plate 2 comprises a recessed portion 5 to enable it to be connected to the valve, of which only the valve seat 4 is shown to enable the drawing to be understood more clearly. The end portion 6 of the casing which is remote from the valve and the opening in which may be closed in a dustproof manner by means not illustrated, is divided off from the rest of the casing 1 by a partition 7.

Contained in the casing 1 is an A.C. operated electromagnet 8 which consits of a yoke 10, carrying a winding 9, and a T-shaped armature 11. The yoke 10, which carries a short-circuit winding 12 at that of its ends presented to the armature 11, as well as the armature 11 are laminated.

The armature 11 of the electro-magnet 8 is secured by means of a pin 11' to a valve spindle 13 which extends throughout the casing 1 and projects well into the upper portion 6 of the casing. This valve spindle 13 is longitudinally displaceable in correspondence with the lift of the valve and carries at its lower end the closure member of the valve, which member takes the form of a disc 14 made of elastic material; this disc is biased by a closing spring 16 fitted between a shoulder 15 on the disc and the casing plate 2, and is urged by this spring against the valve seat 4.

Fitted over that portion of the valve spindle 13 that is directed into the upper portion 6 of the casing is a tube 17, which is displaceable relatively to the casing 1 and the valve spindle 13; the electro-magnet 8 is secured to that end of the tube 17 located within the casing 1. The end of the tube 17 that projects into the upper portion 6 of the casing carries a rack 18.

The electro-magnet 8 is displaceable in the longitudinal direction of the valve spindle 13 by means of the tube 17 which constitutes a drive element that is in engagement with a displacing means contained in the upper portion 6 of the casing. The casing 1 contains guides 19 for the electro-magnet 8 and the armature 11, and these two components are adapted to slide on these guides.

Rings 20 in the plate 2, in the partition 7 and at that end of the tube 17 located within the casing 1 provided oil-tight seals between the movable parts and between these parts and the casing 1.

A reversible geared motor 21, constituting the power-actuated displacing means, is mounted by means of flanges in the upper portion 6 of the casing; a pinion 23 which meshes with the rack 18 is mounted on the driving shaft 22 of this motor. Also secured to this driving shaft 22 are four cam discs 24 which rotate with the shaft 22. The driving shaft 22 extends through the sidewall 25 of the upper portion 6 of the casing and at that point carries an indicating means in the form of a disc 27 which carries a scale 26, and opposite which is positioned a pointer 28. Mounted at the end of the driving shaft 22 is a rocking lever 29 to which is connected a control rod 30. Electric control switches 31 are positioned opposite the four cam discs 24, and the feelers 32 of the switches are actuated by the cams.

Also provided in the upper part 6 of the casing is an electric limit-switch 33, the feeler 34 of which is actuated by that end of the valve spindle 13 that projects beyond the tube 17.

On its outer wall 35 the casing 1 has cooling fins 36 formed during the casting of the casing.

I claim:

1. A valve actuator comprising a casing adapted to be connected to a valve of the kind comprising a closure means movable towards and away from a valve seat, and including an electro-magnet, a cooperating armature connected to a longitudinally displaceable valve spindle controlling the position of the closure member, means mounting the electro-magnet for movement in the longitudinal direction of the valve stem, power actuated displacing means and a drive element including a tube which is slidably mounted on the valve spindle, secured to said electro-magnet and engaged by said displacing means.

2. A valve actuator according to claim 1 in which the displacing means is a reversible geared motor, on the driving shaft of which is mounted a pinion which meshes with a rack provided on the tube.

3. A valve actuator according to claim 1, in which an electric limit-switch actuated by the valve spindle is fitted on the casing.

4. A valve actuator according to claim 2, in which cam discs, for actuating electric control switches provided on the casing, are mounted on the driving shaft of the geared motor.

5. A valve actuator according to claim 2, in which the driving shaft carries a rocking lever which is connected to a control rod.

6. A valve actuator according to claim 2, in which an indicating means is provided on the driving shaft.

7. A valve actuator according to claim 1, in which slide bars for the electro-magnet and the armature are provided in the casing.

8. A valve actuator according to claim 1, in which the yoke of the electro-magnet, as well as the armature are laminated.

9. A valve actuator according to claim 1, in which the casing is rendered oil-proof by means of seals, and has cooling fins on its outer wall.

* * * * *